US008275975B2

(12) United States Patent
Ors et al.

(10) Patent No.: US 8,275,975 B2
(45) Date of Patent: Sep. 25, 2012

(54) SEQUENCER CONTROLLED SYSTEM AND METHOD FOR CONTROLLING TIMING OF OPERATIONS OF FUNCTIONAL UNITS

(75) Inventors: Ali Osman Ors, Ottawa (CA); Daniel Laroche, Kemptville (CA); Jean-François Deschênes, Gatineau (CA)

(73) Assignee: Mtekvision Co., Ltd., Seoul (KR)

( * ) Notice: Subject to any disclaimer, the term of this patent is extended or adjusted under 35 U.S.C. 154(b) by 386 days.

(21) Appl. No.: 12/019,965

(22) Filed: Jan. 25, 2008

(65) Prior Publication Data
US 2009/0193234 A1  Jul. 30, 2009

(51) Int. Cl.
G06F 9/30 (2006.01)
(52) U.S. Cl. ...................................................... 712/214
(58) Field of Classification Search .................. None
See application file for complete search history.

(56) References Cited

U.S. PATENT DOCUMENTS

| | | | |
|---|---|---|---|
| 4,700,292 A | 10/1987 | Campanini | |
| 4,901,232 A * | 2/1990 | Harrington et al. | 710/6 |
| 5,159,674 A * | 10/1992 | Stadlmeier et al. | 712/207 |
| 5,732,251 A * | 3/1998 | Bartkowiak | 712/221 |
| 6,012,107 A * | 1/2000 | Young | 710/39 |
| 6,144,982 A * | 11/2000 | Panwar | 718/104 |
| 6,625,740 B1 | 9/2003 | Datar et al. | |
| 6,678,645 B1 | 1/2004 | Rajsuman et al. | |
| 6,751,751 B1 | 6/2004 | Murray et al. | |
| 6,963,340 B1 | 11/2005 | Alben et al. | |
| 6,988,214 B1 | 1/2006 | Verdun | |
| 7,058,790 B2 | 6/2006 | Barry et al. | |
| 7,725,698 B2 * | 5/2010 | Saito et al. | 712/245 |
| 7,904,696 B2 * | 3/2011 | Wang et al. | 712/29 |
| 2004/0098549 A1 * | 5/2004 | Dorst | 711/167 |
| 2005/0278502 A1 * | 12/2005 | Hundley | 712/34 |
| 2007/0157211 A1 * | 7/2007 | Wang et al. | 719/313 |

OTHER PUBLICATIONS

Hyde (Art of Assembly Language, 1st Edition, Sep. 1, 2003); pp. 99 and 1014 attached.*

* cited by examiner

*Primary Examiner* — Keith Vicary
(74) *Attorney, Agent, or Firm* — Birch, Stewart, Kolasch & Birch, LLP

(57) ABSTRACT

The invention proposes a simple method for controlling distributed functional units (FU) in a system. It offloads the main system processor from intermediate status monitoring. The sequencer controlled system comprises a plurality of functional units, a processor operatively coupled to the plurality of functional units through a bus, a sequencer having a set of registers, and an interrupt source register configured for interrupt polling. The registers are configured to control the timing of at least one operation of the functional units with stored instructions for each of the functional units. The processor sets up at least some of the registers through the bus for the initial configuration and the sequencer is activated by the processor.

18 Claims, 3 Drawing Sheets

SEQUENCER CONTROLLED SYSTEM AND METHOD FOR CONTROLLING TIMING OF OPERATIONS OF FUNCTIONAL UNITS

BACKGROUND OF THE INVENTION

1. Field of the Invention

The present invention is related to a generic sequence controller of distributed functional units.

2. Background Art

Advances in integrated circuit technology have made it possible to embed an entire system, including a processor core, a memory unit, a high performance bus, and a programmable logic, in a single semiconductor device. Present techniques allow for the fabrication of up to approximately fifty million gates per chip. Higher gate densities and clock frequencies will allow the development of Systems-On-A-Chip (SoCs) in which processing circuitry, memory and input/output devices are all fabricated together on a chip and distributed in a single package. This type of programmable semiconductor device is commonly referred to as a system-on-chip (SoC), or a configurable system-on-chip (CSoC). For example, a microprocessor or microcontroller may be fabricated together with on-chip memory for storing the operating system and/or the basic input/output system (BIOS). The applications for SoCs are numerous, including portable personal computers, mobile personal communicators, and similar compact systems. The SoC provides many advantages over traditional processor-based designs. It is an attractive alternative to multi-chip designs because the integration of components into a single device increases overall speed while decreasing size. The SoC is also an attractive alternative to fully customized chips, such as an ASIC (application specific integrated circuit), because ASIC designs tend to have a significantly longer development time and larger development costs.

The invention proposes a simple method for controlling distributed functional units (FU) in an SoC system. It offloads the main system processor from intermediate status monitoring.

U.S. Pat. No. 6,963,340 to Alben discloses the microcontroller functions as a sequencer for controlling the timing of power up and/or power down operations by one or both of a graphics processor and a display device. For example, the microcontroller is implemented in a graphics processor and controls the timing which the graphics processor and a display device coupled thereto perform the steps required to enter or leave a "suspend" mode (or other reduced power consumption mode), or perform the sequence of steps comprising a full power up (or power down) operation. However, it does not offload the processor from intermediate status monitoring.

Further, the prior art does not address an SOC environment with distributed functional units each with their own execution/instruction cache. Prior art does not mention utilizing such a controller for increasing parallelism within the system.

Accordingly, it would be highly desirable to provide an improved sequencer for offloading main processor from controlling all other functional units. Once configured, it can function independent from said main processor. Further, the present invention is simple to configure and fully expandable to accommodate unlimited functional units. Runtime is reconfigurable by the main processor and the functional units. The present invention supports different levels of functional units.

Further objectives and advantages of the present invention will become apparent from a careful reading of a detailed description provided hereinbelow, with appropriate reference to accompanying drawings.

SUMMARY OF THE INVENTION

It is a general object of the present invention to provide a sequencer configured to control the timing of at least one operation of the functional units with stored instructions for each of the functional units in which the above-described disadvantage is eliminated. A more specific object of the present invention is to provide a sequencer controlled system for a system-on-chip (SoC) integrated circuit design. The sequencer controlled system comprises a plurality of functional units; an embedded processor operatively coupled to the plurality of functional units through a bus; and a sequencer having a set of registers. The registers are configured to control the timing of at least one operation of the functional units with stored instructions for each of the functional units. The embedded processor sets up at least some of registers through the bus for the initial configuration and the sequencer is activated by the embedded processor. The registers send out trigger signals based on the waiting pattern programmed in the registers after being activated by the processor and keep track of the stored instructions based on the responses received from each of the functional units. Once one of the functional units completes its operation, it sends a response signal to the sequencer, the response signal indicating completion of the operation. The default status of the sequencer is inactive. An interrupt mask register is configured to individually mask at least one interrupt source. An interrupt clear register is configured to clear raw interrupt sources. The stored instructions include wait, go and stop.

Another aspect of the present invention features a method for controlling timing of operations of functional units, comprising the steps of configuring registers in a sequencer by an external processor to control the timing of operations of functional units through a bus, the sequencer having a set of the registers; activating the sequencer by the processor through the bus; sending trigger signals to at least some of the functional units based, at least in part, upon the waiting pattern programmed in the registers; and keeping track of the stored instructions based on the responses received from each of the functional units.

BRIEF DESCRIPTION OF THE DRAWINGS

These and other features, aspects and advantages of the present invention will become better understood with regard to the following description, appended claims and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DESCRIPTION OF THE EMBODIMENTS

Preferred embodiments of the present invention will be described below with reference to the accompanying drawings.

As used in this application, the terms "module" and "unit" are intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1:
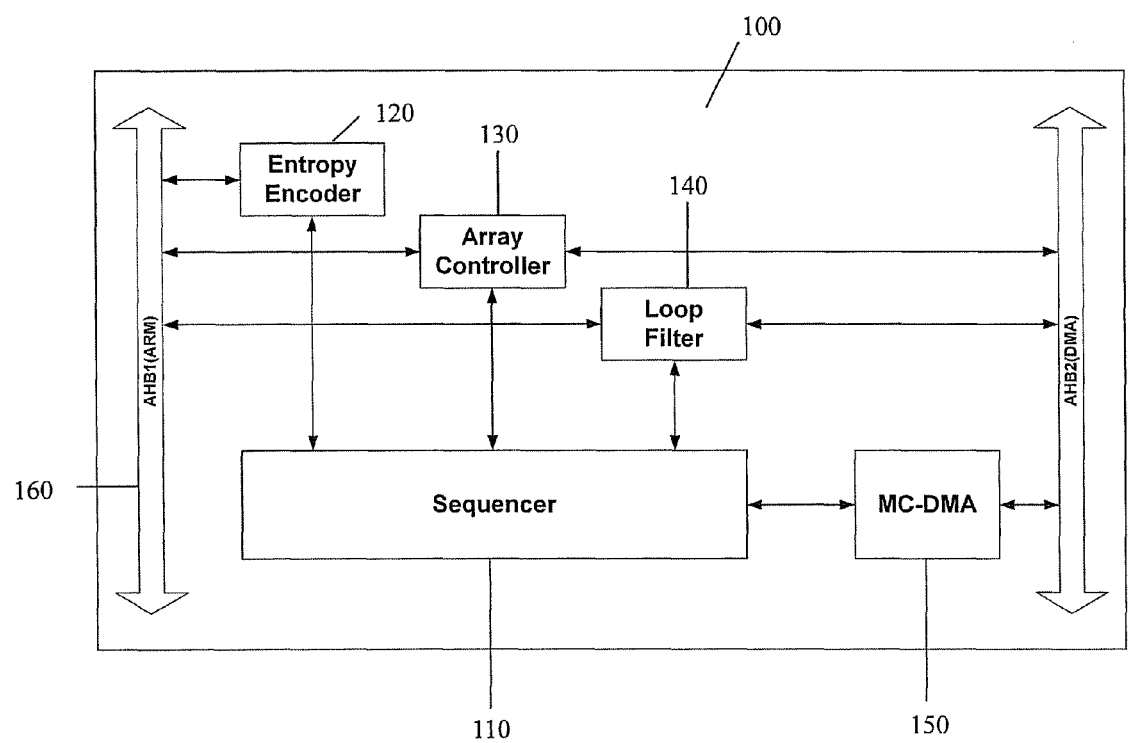
FIG. 1 is a functional block diagram of a system for sequencing functional units, showing a general system view of where the Sequencer fits in the SOC design in accordance with an embodiment of the present invention.
Figure 2:
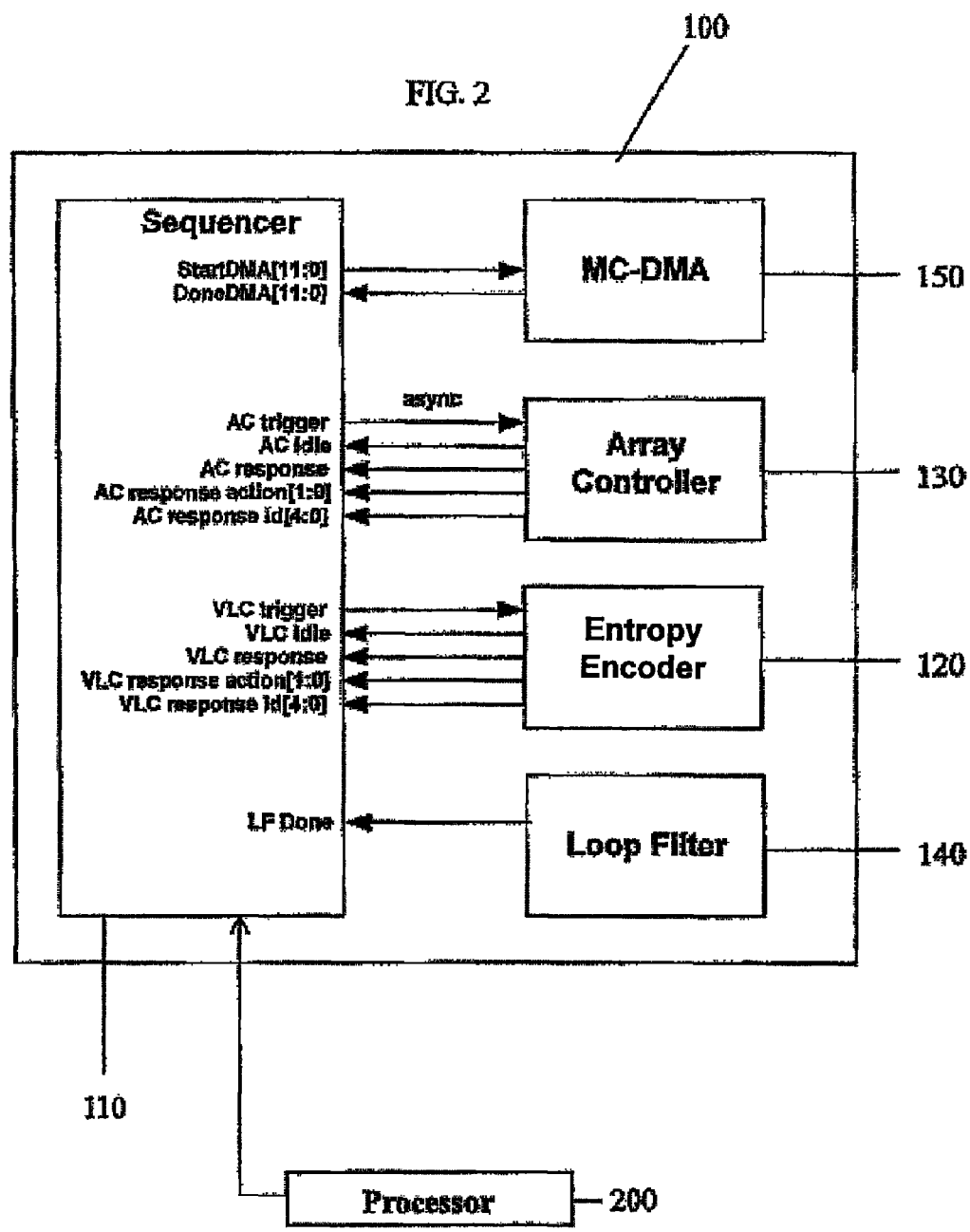
FIG. 2 is a block diagram of a system for sequencing functional units, showing signal connectivity between the sequencer and the sequencer controlled blocks. in accordance with an embodiment of the present invention.

FIG. 1 is a diagram of an exemplary system 100 embodying the teachings of the present invention. System 100 advantageously integrates the functionality of a general purpose microprocessor based computer system on a single printed circuit (PC) board. Referring to FIG. 1, a sequencer controlled system 100 is illustrated. The Sequencer 110 is designed to relieve the embedded processor 200, as shown in FIG. 2, to some extent from controlling all the sequencing of events on the SOC chip. The embedded processor 200 can be an ARM based processor, Tensilica, MIPS, X86, PowerPC, or any other processor used with SOC systems. In one embodiment, the sequencer controlled system 100 could comprise several such embedded processors. The sequencer 110 can control a multitude of processors in a scalable way. The sequencer controlled system 100 further comprises a plurality of functional units controlled by the sequencer.

One embodiment of the functional units can be an array controller (AC) 130, an encoder 120, a loop filter (LF) 140 and/or DMA channels 150 which are given stop and go instructions from the Sequencer (SEQ) so that the embedded processor 200 no longer has to poll the interrupt lines of the blocks to decide when and to which block to issue a set of commands. In further embodiment, the functional units can be computational hardware (such as a microcontroller, an array processor, video and image encoding/decoding hardware blocks, DMA channels, a load/store unit, data manipulation blocks including arithmetic logic unit, memory address register and a multiplier) and communicate with a bussing structure. The blocks that are controlled by the Sequencer 110 are referred to as Sequencer Controlled Blocks (SCBs). These functional units are only one embodiment of the present invention. The functional units of the present invention could include microcontrollers, array processors, video and image encoding/decoding hardware blocks, DMA channels, data manipulation blocks, or any other suitable modules.

However, in one embodiment of the present invention, these functional units could be divided into at least four categories based upon the communications with the Sequencer as below.

The first category of the functional units is associated with only trigger (START) signals in communication with the Sequencer. It would be appreciated by those skilled in the art that functional units associated with only trigger (START) signals in communication with the sequencing module may fall within this category.

The second category of the functional units is associated with only response (DONE) signals in communication with the Sequencer. An example of the second category functional unit is a loop filter 140. The loop filter 140 can be used for a phase lock loop (PLL) and is typically operated in an adapt mode and a normal mode. The Loop Filter 140 has only one signal as the table below. The Loop Filter 140 has an associated "Done" signal.

| Signal Name | Direction (SEQ centric) | Description |
| --- | --- | --- |
| LF-Done | Input | Active High Pulse. Done signal from LF increment resources selected in LF Increment Register |

The third category of the functional units is associated with both trigger and response (START-DONE) signals in communication with the Sequencer. An example of the third category functional unit is Direct memory access (DMA) channels 150. The DMA 150 allows certain hardware subsystems within the computer to access system memory for reading and/or writing independently of the central processing unit. The DMA channels 150 typically allow the system to transfer data to and from devices with much less CPU overhead than systems without a DMA channel. Referring to FIG. 2, the Multi-Channel DMA 150 operation is kept simple because the DMA channels 150 do not have command queues like the other blocks. Each DMA channel has an associated "Start" and one "Done" signal as the following table:

| Signal Name | Direction (SEQ centric) | Description |
| --- | --- | --- |
| DMAx-Start | Output | Active High Pulse. DMA channel should start transfer |
| DMAx-Done | Input | Active High Pulse. DMA channel completed transfer. |

The fourth category of the functional units is associated with both trigger and response (START-DONE) signals in communication with the Sequencer, as well as advanced capabilities to change the sequencer settings. Examples of the fourth category functional units are an Entropy Encoder 120 and an Array Controller (AC) 130. The Entropy Encoder 120 generally assigns codes to symbols so as to match code lengths with the probabilities of the symbols. The Entropy Encoder 120 is used to compress data by replacing symbols represented by equal-length codes with symbols represented by codes where the length of each codeword is proportional to the negative logarithm of the probability. Other functions for the Entropy Encoder 120, which may also be referred to as a Variable Length Coding Encoder (VLC Encoder or VE), will be readily apparent to those skilled in the art. The Array Controller 130 generally provides command strobe signals for synchronizing operation of the individual processing elements. Other functions for the array controller 130 will also be readily apparent to those skilled in the art. The Array Controller 130 and Entropy Encoder 120 can have five (5) signals each as the table below. The "Trigger" signal is used to start off a series of commands in the respective command queues of these blocks. To work with the sequencer 110 the AC and VE need to support "Wait for Trigger" commands. The "Response" signal is a pulse that requests an action from the Sequencer 110, the action is encoded as 2 bits Action+5 bits ID. If the response action is an increment to a resource, this is treated as an interrupt request and an end of sequence for that SCB, so the SCB is deemed idle afterwards. The Array Controller 130 interface to the sequencer is the same as the Entropy Encoder 120 interface to the sequencer but the signals are treated as asynchronous handshaking signals.

| Signal Name | Direction (SEQ centric) | Description |
| --- | --- | --- |
| AC/VE-Trigger | Output | Active High Pulse. Resume executing commands in queue. |
| AC/VE-Idle | Input | Active High status Level Block is ready to receive a trigger ID [1:0] selects which Decrement register to use |
| AC/VE-Response | Input | Active High Pulse Evaluate Response Action and Id signals |
| AC/VE-Response Action | Input | 2 bit value 00: Enter wait for trigger mode Decrement register selected by ID[1:0] 01: Increment based on Increment register selected by ID[1:0] 10: Toggles 'Decrement' Register 0' 11: Increment resource count |
| AC/VE-Response Action Id[4:0] | Input | 5 bit id value id for the Resource to increment or bit position on 'Decrement Register' |

System-on-a-chips are not limited to the entertainment and personal computing system environments, such that discussed above. They are also suitably applied in telecommunications applications such as cellular telephones and personal communicators which require compact systems including a processing device and memory. In these systems, increasing parallelism within the system is required. The principles of the present invention advantageously allow for selective control of functional units within a single chip integrated circuit device without burden on the main embedded processor. This is particularly important for SoC applications and similar complex high-gate density, high-clock frequency devices.

In one embodiment, the sequencer 110 may have thirty-two internal "Resources", 28 of these resources are 3-bit, 2 are 8-bit and 2 are 16-bit counters used to represent an on chip entity. On chip processes use these resources to complete their operations. The resource refers to numeric values which represent processes running on the SoC chip, the available storage memory, the transfer channels, the available processing power, or any other processes for the SoC chip.

In further embodiment, the SCBs have a given configuration that is programmed through an Advanced Microcontroller Bus Architecture High-Performance (AHB) bus 160 at the beginning. And the default state of the sequencer 110, in one embodiment, is inactive. After the registers are setup for a given process the sequencer 110 can be activated by the processor 200 or a functional unit. Once active the sequencer 110 sends out triggers based on the waiting pattern programmed in the registers and it keeps track of the Resources based on the responses being received from the SCBs. Each bit space represents one of the Resources, if DMA 0 is waiting on Resource 0 and Resource 5 to be available. The count value for both of those Resources has to be more then one for the DMA0_start signal to be sent to the MC-DMA, the sequencer 110 will decrement the resource count for both Resource_0 and Resource_5. Once the DMA channel is complete it will respond with a DMA0_done signal, the sequencer 110 will look at the DMA0 setup register and increment the Resources that are enabled in the Increment Resources field. For the other SCBs the initial wait setup is provided by the processor 200, once the resource being waited for becomes available a trigger is sent to that SCB. After the operation completes the SCB will respond with a response and request to increment one of the resources. Multiple responses can be received for one trigger to increment multiple resources. If a toggle response is received, that response is used to toggle the Decrement Register bit for that resource. If, for example, the Array Controller 130 is waiting for Resource 2 and Resource 3, a response of Decrement 3 would change the wait status of Array Controller 130 to only wait for Resource 2, another Decrement 3 response would set the wait for status back to its initial value.

In certain low power systems, such as battery operated computers and other battery powered devices that are controlled by a digital processor, there are times during which the system is not being actively used or is not actively performing any useful work. During such times, transitioning the system to a sleep state or low power consumption state will preserve battery power while having minimal impact on system performance. Furthermore, when such systems detect that battery power is below a specified level, switching to a lower power mode of operation will delay the time at which battery power to the system is lost. The interrupt is an asynchronous signal from hardware indicating the need for attention or a synchronous event in software indicating the need for a change in execution. The interrupts were introduced as a way to avoid wasting the processor's valuable time in polling loops, waiting for external events. The interrupt source register contains the raw unmasked interrupts and can be used for polling purposes (instead of the external interrupt pin) or to determine which interrupt(s) have caused the external interrupt pin to assert. The interrupt instructions are serviced by the embedded processor 200. In another embodiment, these interrupts can be generated for one or a subset of embedded processors if it is a multi processor system.

The interrupt mask register provides a mechanism to individually mask one or more of the interrupt sources. The interrupt clear register provides the mechanism for clearing the raw interrupt sources.

The Sequencer 110 is not enabled by default and it has to be setup before being activated, if a SCB is not 'On' the setup register for that SCB is ignored. AC/VE Idle signal signals that the SCB is waiting for a trigger. In Debug mode the sequencer 110 issues starts and triggers only if there is a step received for the associated SCB. The Array Controller 130 and the Entropy Encoder 120 AC/VE are idle if the SCB received a trigger and did not respond with a ACNE interrupt request.

All the resources marked need to have a non zero resource count before a trigger is given. All the resources marked will be incremented if a LF done signal is received. ARM write decrements the resources selected waits until the resources are available, and issues an interrupt when such is successfully completed. ARM write increments the resources selected. All resource counts are at zero at Reset which also would keep the Sequencer inactive.

In another embodiment, the sequencer of the present invention could be designed to be active right away, or to be inactive until activated by the processor or even by one of the functional units.

Figure 3:
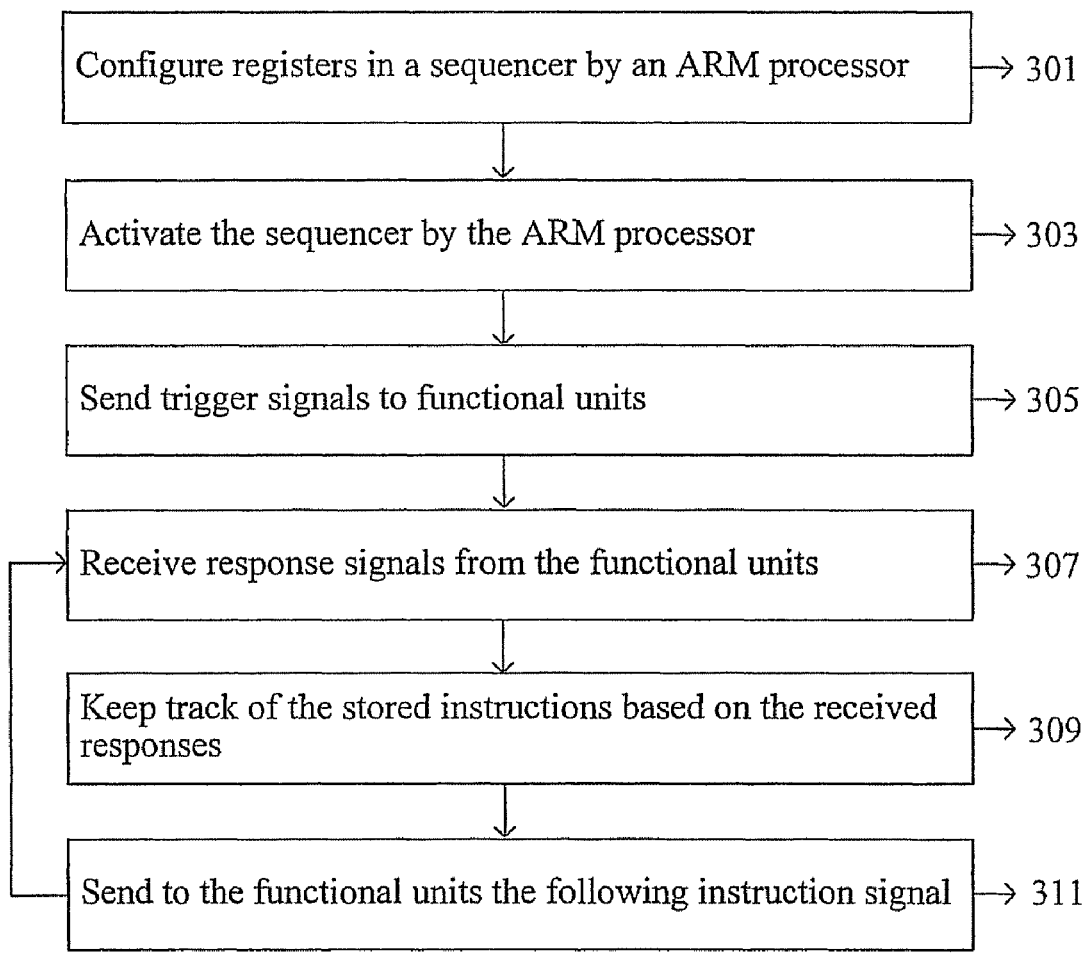
FIG. 3 is a flowchart illustrating a method for processing image data in accordance with an embodiment of the present invention.

The FIG. 3 is a flowchart illustrating a method for controlling timing of operations of the functional units 120, 130, 140, 150. The sequencer 110 controls timing of operations of the functional units 120, 130, 140, 150.

In operation 301, the processor 200 configures registers of the sequencer 110 to control the timing of the operations of the functional units, such as the entropy encoder 120, the array controller 130, the loop filter 140, and the multi-channel DMA 150, through the bus 160. The sequencer 110 has a set of the registers. The processor 200 configures each of the registers with instructions to control each of the functional units 120, 130, 140, 150. The instructions include wait, go and stop instruction. The default status of the sequencer 110 is inactive status.

In operation 303, once the sequencer 110 is configured, the processor 200 activates the sequencer 110 through the bus 160.

In operation 305, the sequencer 110 sends trigger signals to the functional units 120, 130, 150 according to the waiting pattern programmed in the registers.

In operations 307 and 309, the sequencer 110 receives response signals from the functional units 120, 130, 140, 150 and keeps track of the programmed instructions based upon the responses from each of the functional units 120, 130, 140, 150. Once one of the functional units 120, 130, 140, 150 completes its operations, it sends the response signal to the sequencer 110, which indicates completion of the operation.

In operation 311, the sequencer 110 sends the following instructions to the functional units 120, 130, 140, 150 according to the waiting pattern programmed in the registers.

Although a preferred embodiment of the present invention has been described, anyone of ordinary skill in the art to which the invention pertains should be able to understand that a very large number of permutations are possible without departing the spirit and scope of the present invention, which shall only be defined by the claims appended below.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A sequencer controlled system for a system-on-chip (SoC) integrated circuit design, comprising:
a plurality of hardware functional units;
an embedded processor operatively coupled to said plurality of hardware functional units through a bus; and
a sequencer having a set of registers, said registers being configured to control the start of at least one operation of said plurality of hardware functional units with stored instructions for each of said plurality of hardware functional units, said sequencer further having a plurality of resources associated with numeric values which represent status information, the status information consisting of available direct memory access (DMA) transfer channels and others selected from the group consisting of processes running on said SoC, available memory area for storage, and available processing power,
wherein the numeric values of the plurality of resources are modified based on responses received from each of the plurality of hardware functional units,
wherein said sequencer sends out trigger signals concurrently, to the plurality of said hardware functional units, based on a waiting pattern programmed in said registers as a direct response to being activated by said embedded processor, and keeps track of said resources based on the responses received from each of said plurality of hardware functional units, and
all of the resources corresponding to said waiting pattern are available before said trigger signal is sent.

2. The sequencer controlled system of claim 1, wherein said sequencer is activated by said embedded processor or one of said plurality of hardware functional units.

3. The sequencer controlled system of claim 1, wherein said plurality of hardware functional units comprise a first hardware functional unit, said first hardware functional unit being associated with only trigger signals in communication with said sequencer.

4. The sequencer controlled system of claim 1, wherein said plurality of hardware functional units comprise a second hardware functional unit, said second hardware functional unit being associated with only response signals in communication with said sequencer.

5. The sequencer controlled system of claim 1, wherein said plurality of hardware functional units comprise a third hardware functional unit, said third hardware functional unit being associated with both trigger and response signals in communication with said sequencer.

6. The sequencer controlled system of claim 1, wherein said plurality of hardware functional units comprise a fourth hardware functional unit, said fourth hardware functional unit being associated with both trigger and response signals in communication with said sequencer wherein said fourth hardware functional unit is configured to change sequencer settings.

7. The sequencer controlled system of claim 1, wherein said plurality of hardware functional units include at least one selected from the group consisting of a microcontroller, an array processor, a video and image encoder, and data manipulation blocks.

8. The sequencer controlled system of claim 1, wherein said sequencer comprises at least one interrupt instruction, said interrupt instruction being serviced by said embedded processor.

9. The sequencer controlled system of claim 1, wherein said embedded processor sets up at least some of registers through said bus for an initial configuration.

10. A sequencer controlled system for a system-on-chip (SoC) integrated circuit design, comprising:
   a plurality of functional units;
   an embedded processor operatively coupled to said plurality of functional units through a bus; and
   a register for controlling the start of at least one operation of said plurality of functional units with stored instructions for each of said plurality of functional units, said register further having a plurality of resources associated with numeric values which represent status information, the status information consisting of available direct memory access (DMA) transfer channels and others selected from the group consisting of processes running on said SoC, available memory area for storage, and available processing power,
   wherein the numeric values of the plurality of resources are modified based on responses received from each of the plurality of functional units,
   wherein said register sends out trigger signals concurrently, to the plurality of said hardware functional units, based on a waiting pattern programmed in said register as a direct response to being activated by said embedded processor, and keeps track of said resources based on the responses received from each of said plurality of functional units, and
   all of the resources corresponding to said waiting pattern are available before said trigger signal is sent.

11. The sequencer controlled system of claim 10, wherein said register is activated by said embedded processor or one of said functional units.

12. The sequencer controlled system of claim 10, wherein said plurality of functional units comprise a first functional unit, said first functional unit being associated with only trigger signals in communication with said register.

13. The sequencer controlled system of claim 10, wherein said plurality of functional units comprise a second functional unit, said second functional unit being associated with only response signals in communication with said register.

14. The sequencer controlled system of claim 10, wherein said plurality of functional units comprise a third functional unit, said third functional unit being associated with both trigger and response signals in communication with said register.

15. The sequencer controlled system of claim 10, wherein said plurality of functional units comprise a fourth functional unit, said fourth functional unit being associated with both trigger and response signals in communication with said register, wherein said fourth functional unit is configured to change sequencer settings.

16. The sequencer controlled system of claim 10, wherein said plurality of functional units include at least one selected from the group consisting of a microcontroller, an array processor, a video and image encoder, and data manipulation blocks.

17. The sequencer controlled system of claim 10, wherein said register comprises at least one interrupt instruction serviced by said embedded processor.

18. A method for controlling timing of operations of functional units, said method comprising:
   configuring registers in a sequencer by an external processor to control the start of operations of functional units through a bus, said sequencer having a set of said registers;
   activating said sequencer by said external processor through said bus; and
   sending trigger signals to at least some of said functional units based, at least in part, upon a waiting pattern programmed in said registers,
   wherein said sequencer has a plurality of resources associated with numeric values which represent status information, the status information consisting of available direct memory access (DMA) transfer channels and others selected from the group consisting of processes, available memory area for storage, and available processing power,
   wherein the numeric values of the plurality of resources are modified based on responses received from each of the plurality of functional units,
   wherein said trigger signals are sent concurrently based on waiting patterns programmed in said registers as a direct response to being activated by said external processor and said resources are kept track of based on the responses received from each of said functional units, and
   all of the resources corresponding to said waiting pattern are available before said trigger signal is sent.

* * * * *